US012562592B2

(12) United States Patent
Chiyo et al.

(10) Patent No.: US 12,562,592 B2
(45) Date of Patent: Feb. 24, 2026

(54) COIL MODULE AND WIRELESS POWER TRANSMISSION DEVICE

(71) Applicant: TDK Corporation, Tokyo (JP)

(72) Inventors: Noritaka Chiyo, Tokyo (JP); Michihisa Tokui, Tokyo (JP); Takuya Yoshida, Tokyo (JP)

(73) Assignee: TDK Corporation, Tokyo (JP)

( * ) Notice: Subject to any disclaimer, the term of this patent is extended or adjusted under 35 U.S.C. 154(b) by 983 days.

(21) Appl. No.: 17/722,744

(22) Filed: Apr. 18, 2022

(65) Prior Publication Data

US 2022/0352752 A1 Nov. 3, 2022

(30) Foreign Application Priority Data

Apr. 29, 2021 (JP) ................................. 2021-076902

(51) Int. Cl.
H02J 50/00 (2016.01)
H01F 27/28 (2006.01)
H02J 50/12 (2016.01)

(52) U.S. Cl.
CPC ............ H02J 50/005 (2020.01); H01F 27/28 (2013.01); H02J 50/12 (2016.02)

(58) Field of Classification Search
CPC ......... H01F 27/28; H02J 50/005; H02J 50/10; H02J 50/12; H02J 50/90
USPC ................................................. 336/184, 200
See application file for complete search history.

(56) References Cited

U.S. PATENT DOCUMENTS

| | | | | |
|---|---|---|---|---|
| 10,340,725 B2 * | 7/2019 | An | ........................ | H02J 7/0042 |
| 11,449,725 B2 * | 9/2022 | Matsushima | .... | G06K 19/07794 |
| 2009/0212637 A1 * | 8/2009 | Baarman | ................. | H02J 50/70 |
| | | | | 307/104 |
| 2013/0005251 A1 * | 1/2013 | Soar | ........................ | H02J 50/12 |
| | | | | 307/9.1 |
| 2013/0249312 A1 * | 9/2013 | Uchida | .................... | H04B 5/79 |
| | | | | 307/104 |
| 2015/0115727 A1 * | 4/2015 | Carobolante | ............ | H04B 5/79 |
| | | | | 307/104 |
| 2016/0049729 A1 * | 2/2016 | Chan | ........................ | H01Q 1/40 |
| | | | | 343/868 |
| 2017/0207664 A1 * | 7/2017 | Garrity | ................... | H01F 38/14 |
| 2019/0148053 A1 * | 5/2019 | Kaneko | ................... | H01F 27/29 |
| | | | | 336/192 |

(Continued)

FOREIGN PATENT DOCUMENTS

| | | | | | |
|---|---|---|---|---|---|
| CN | 101069323 A | * | 11/2007 | .............. | H01Q 7/00 |
| JP | 11-134447 A | | 5/1999 | | |

(Continued)

*Primary Examiner* — Shawki S Ismail
*Assistant Examiner* — Joselito S. Baisa
(74) *Attorney, Agent, or Firm* — Rimon P.C.

(57) ABSTRACT

Disclosed herein is a coil module that includes a holder having a flat-plate part for placing thereon a target device, a first stopper extending in a first direction along a first side of the flat-plate part, and a second stopper extending in a second direction orthogonal to the first direction along a second side of the flat-plate part; and a coil provided so as to overlap the flat-plate part of the holder. As viewed in a coil axis direction, an outer size of the coil in a third direction inclined at a predetermined angle with respect to the first direction is larger than an outer size of the coil in a fourth direction orthogonal to the third direction.

15 Claims, 10 Drawing Sheets

(56) References Cited

U.S. PATENT DOCUMENTS

2020/0335273 A1    10/2020  Wang
2021/0110962 A1     4/2021  Chiyo et al.

FOREIGN PATENT DOCUMENTS

JP        2008092131  A  *   4/2008
JP        2011-234514 A      11/2011
JP        2013-093973 A      5/2013
JP        2018-113765 A      7/2018
JP        2020-178110 A      10/2020
WO     WO-2013032205 A2 *   3/2013   .............. H02J 50/12
WO     WO-2014070443 A2 *   5/2014   .......... H02J 7/00034
WO     WO-2015077782 A1 *   5/2015   ............ H02J 50/005

* cited by examiner

COIL MODULE AND WIRELESS POWER TRANSMISSION DEVICE

CROSS-REFERENCE TO RELATED APPLICATION

This application claims the benefit of Japanese Patent Application No. 2021-076902, filed on Apr. 29, 2021, the entire disclosure of which is incorporated by reference herein.

BACKGROUND

Field

The present disclosure relates to a coil module and a wireless power transmitting device.

Description of Related Art

As described in JP 2013-093973A, a holder for placing thereon a target device such as a smartphone sometimes has a coil for charging the target device in a non-contact manner.

However, the holder described in JP 2013-093973A can place thereon only target devices of a predetermined size and thus cannot charge various target devices of different sizes.

SUMMARY

It is therefore an object of the present disclosure to provide an improved coil module provided with a holder and a coil, and a wireless power transmitting device having such a coil module.

A coil module according to one embodiment of the present disclosure includes: a holder having a flat-plate part for placing thereon a target device, a first stopper extending in a first direction along a first side of the flat-plate part, and a second stopper extending in a second direction orthogonal to the first direction along a second side of the flat-plate part; and a coil provided so as to overlap the flat-plate part of the holder. As viewed in a coil axis direction, an outer size of the coil in a third direction inclined at a predetermined angle with respect to the first direction is larger than an outer size of the coil in a fourth direction orthogonal to the third direction.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

Preferred embodiments of the present disclosure will be explained below in detail with reference to the accompanying drawings.

Figure 1:
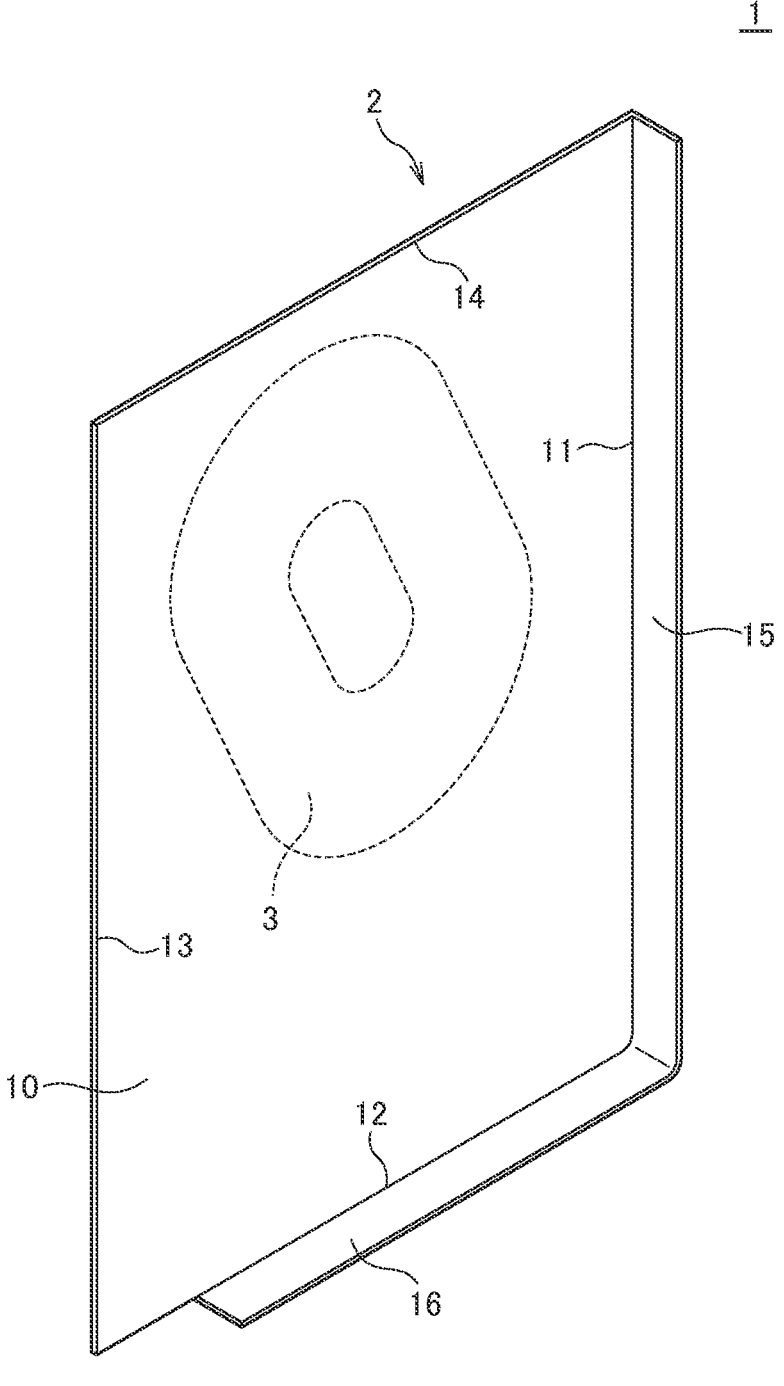
FIG. 1 is a schematic perspective view illustrating the outer appearance of a coil module 1 according to one embodiment.
Figure 1:
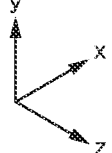

FIG. 1 is a schematic perspective view illustrating the outer appearance of a coil module 1 according to one embodiment.

As illustrated in FIG. 1, the coil module 1 according to the present embodiment includes a holder 2 on which a target device such as a smartphone is placed and a charging coil 3 incorporated in the holder 2. The holder 2 has a flat-plate part 10 for placing thereon the target device. The surface of the flat-plate part 10 is an xy plane and has sides 11 and 13 extending in the y-direction (first direction) and sides 12 and 14 extending in the x-direction (second direction). The side 11 is a first side, and the side 13 is positioned on the side opposite to the side 11. The side 12 is a second side, and the side 14 is positioned on the side opposite to the side 12. The flat-plate part has a vertically elongated shape having a larger dimension in the y-direction than in the x-direction.

The holder 2 further has a side stopper 15 extending in the y-direction along the side 11 of the flat-plate part and a lower stopper 16 extending in the x-direction along the side 12 of the flat-plate part 10. The side stopper 15, which is an example of a first stopper, protrudes in the z-direction to function as positioning the target device placed on the flat-plate part 10 in the x-direction. The lower stopper 16, which is an example of a second stopper, protrudes in the z-direction to function as positioning the target device placed on the flat-plate part 10 in the y-direction. The side stopper 15 may extend along the entire side 11 of the flat-plate part 10 or extend partly along the side 11. Similarly, the lower stopper 16 may extend along the entire side 12 of the flat-plate part 10 or extend partly along the side 12.

The coil 3 is provided so as to overlap the flat-plate part 10 of the holder 2. The coil 3 may be provided inside the flat-plate part 10 or provided on a surface of the flat-plate part 10. The coil 3 has its axis extending in the z-direction. The coil 3 is a transmitting coil used for wireless power transmission and can charge a target device such as a smart phone placed on the holder 2 through wireless power transmission. The holder 2 may have a stand for self-standing, or may eliminate the stand to facilitate user operation of a target device such as a smartphone while charging it. The size of the target device that can be placed on the holder 2 is not fixed, but various target devices of somewhat different sizes can be placed. The target device has a receiving coil used for wireless power transmission. Thus, when current is made to flow in the coil 3 which is a transmitting coil in a state where the coil 3 and the receiving coil overlap each other, the target device is charged in a non-contact manner.

Figure 2:
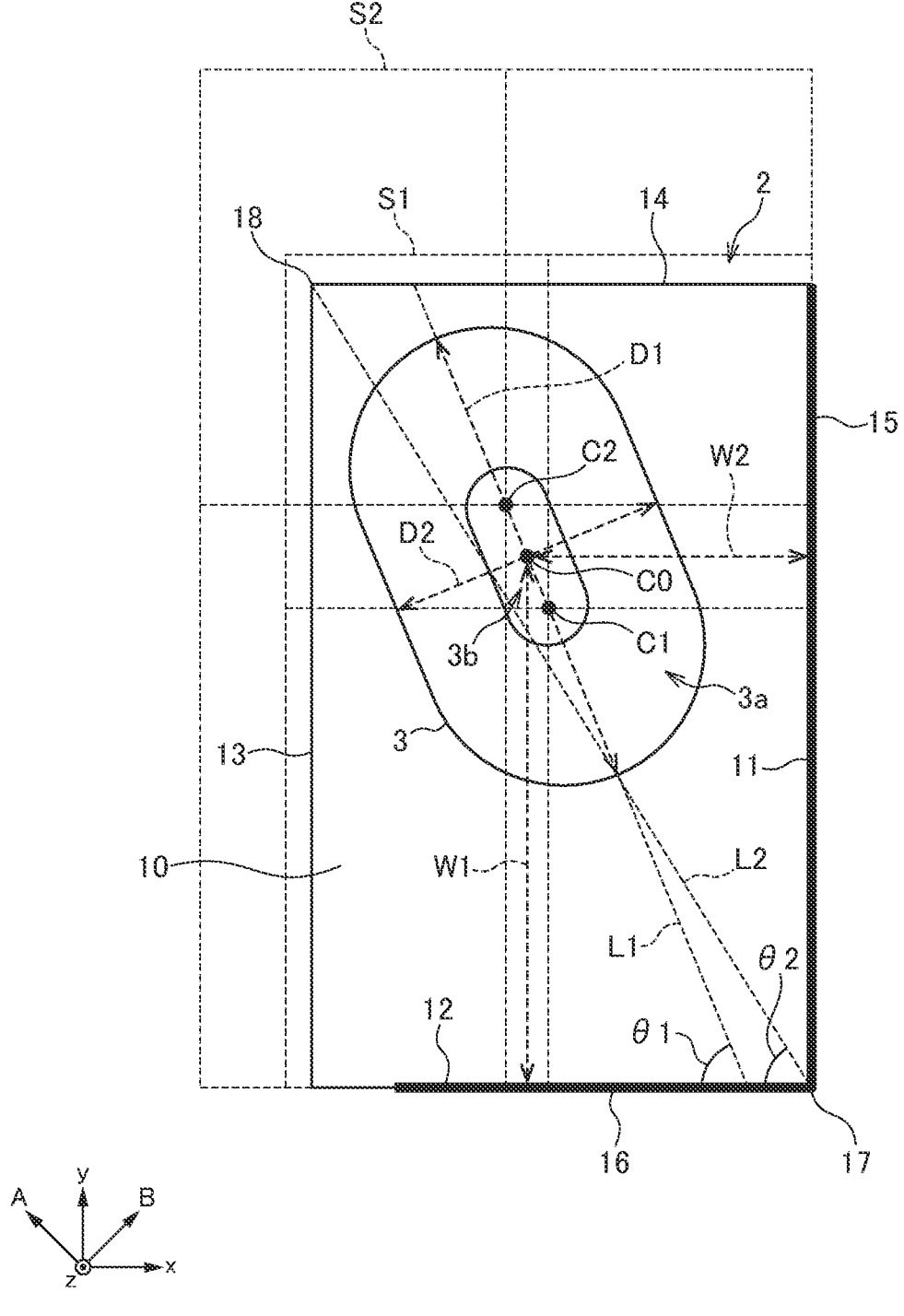
FIG. 2 is a first schematic view for explaining the shape of the coil 3 and the position thereof on the flat-plate part 10.

FIG. 2 is a schematic view for explaining the shape of the coil 3 and the position thereof on the flat-plate part 10.

In FIG. 2, reference numeral 3a denotes a wiring area of a spiral coil pattern constituting the coil 3, and reference numeral 3b denotes an opening area surrounded by the wiring area 3a. As illustrated in FIG. 2, the planar shape of the coil 3 as viewed in the z-direction is not a true circle but an elliptical shape whose long axis has a predetermined inclination with respect to the y-direction. More specifically, assuming that the coil axis of the coil 3 is C0, an outer size D1 of the coil 3 in a direction A which is an example of a third direction passing through the coil axis C0 is larger than an outer size D2 of the coil 3 in a direction B which is an example of a fourth direction passing through the coil axis C0. The direction A and the direction B are orthogonal to each other and have a predetermined inclination with respect to the x- and y-directions. The direction A and the direction B are orthogonal to the z-direction. The coil axis C0 does not coincide with the center of the flat-plate part 10 and is offset therefrom in the x- and y-directions. A distance W1 between the coil axis C0 and the side 12 of the flat-plate part 10 in the y-direction is larger than a distance W2 between the coil axis C0 and the side 11 of the flat-plate part 10 in the x-direction.

As described above, a target device such as a smartphone is placed on the flat-plate part 10 of the holder 2. The receiving coil of the target device (particularly, in the case of a smartphone) is often positioned at the center portion in both the x- and y-directions of the target device. Thus, in either case where a relatively small target device S1 or a relatively large target device S2 is placed on the holder 2, the entire or a part of the receiving coil of the target device S1 or S2 overlaps the coil 3. Although not illustrated, the same applies to a case where a target device larger in size than the target device S1 and smaller in size than the target device S2 is placed on the holder 2. For example, when the relatively small target device S1 is placed on the holder 2, a center position C1 of the receiving coil of the target device S1 overlaps the lower right portion of the opening area 3b of the coil 3, while when the relatively large target device S2 is placed on the holder 2, a center position C2 of the receiving coil of the target device S2 overlaps the upper left portion of the opening area 3b of the coil 3.

Thus, when any of the target devices S1 and S2 of different sizes is placed on the holder 2, the entire or a part of the receiving coil of the target device S1 or S2 overlaps the coil 3, preferably, the center position C1 or C2 of the receiving coil incorporated in the target device S1 or S2 overlaps the opening area 3b of the coil 3 in the z-direction. This causes magnetic flux generated from the coil 3 to efficiently interlink with the receiving coil incorporated in the target device S1 or S2, making it possible to achieve high power transmission efficiency.

As illustrated in FIG. 2, when an imaginary line L1 that extends in the direction A on the flat-plate part 10 so as to pass through the coil axis C0 is assumed, the imaginary line L1 crosses the sides 12 and 14 of the flat-plate part 10 without crossing the sides 11 and 13 of the same. Further, the imaginary line L1 neither crosses a corner part 17 formed by the sides 11 and 12 of the flat-plate part 10 nor a corner part 18 formed by the sides 13 and 14 of the flat-plate part 10 and positioned diagonal to the corner part 17. Assuming that the angle formed by the imaginary line L1 and the side 12 of the flat-plate part 10 is θ1 and that the angle formed by a diagonal line L2 connecting the corner parts 17 and 18 and the side 12 of the flat-plate part 10 is θ2, the relation of θ1>θ2 is satisfied. As described above, the flat-plate part 10 has a vertically elongated shape, so that the angle θ2 exceeds 45°, and the angle θ1 is larger than the angle θ2.

Figure 3:
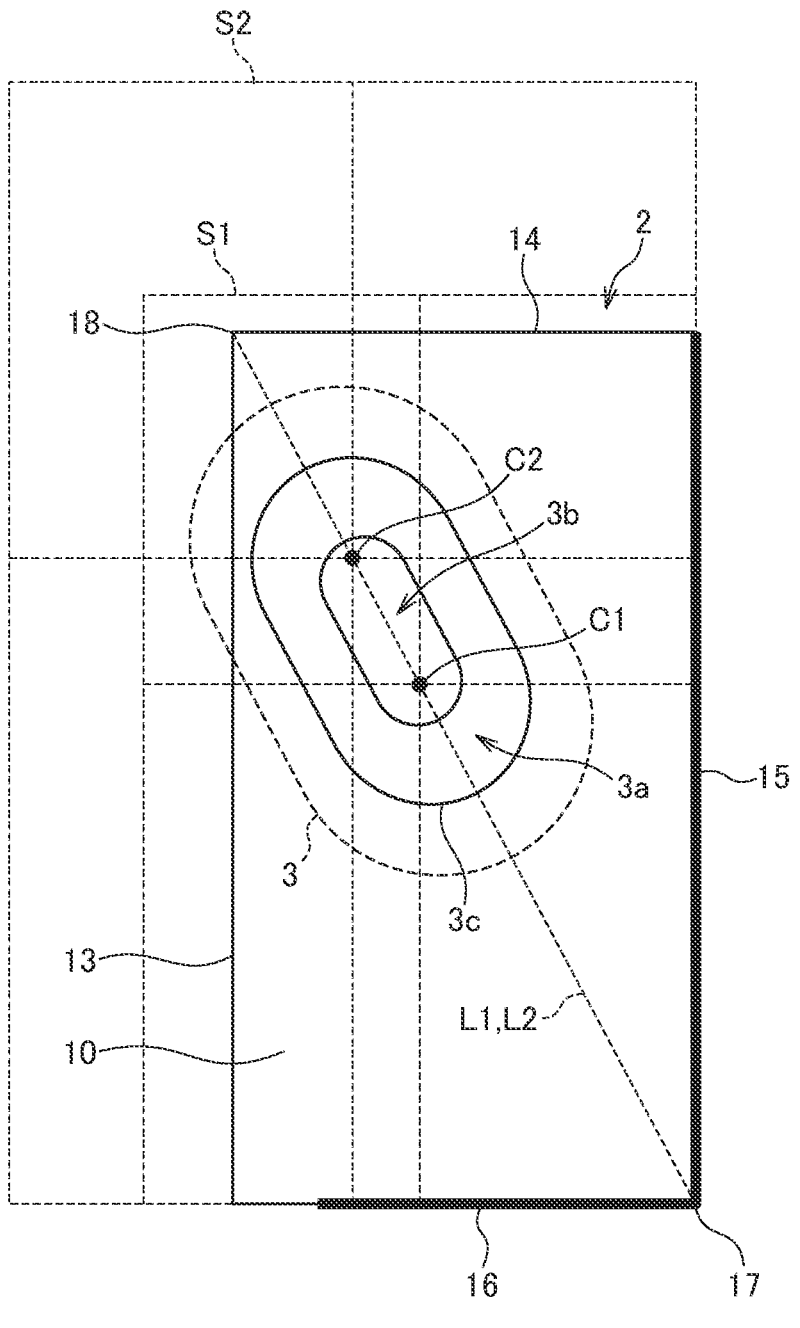
FIG. 3 is a second schematic view for explaining the position of the coil 3c on the flat-plate part 10.
Figure 3:
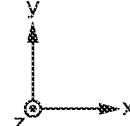
Figure 4:
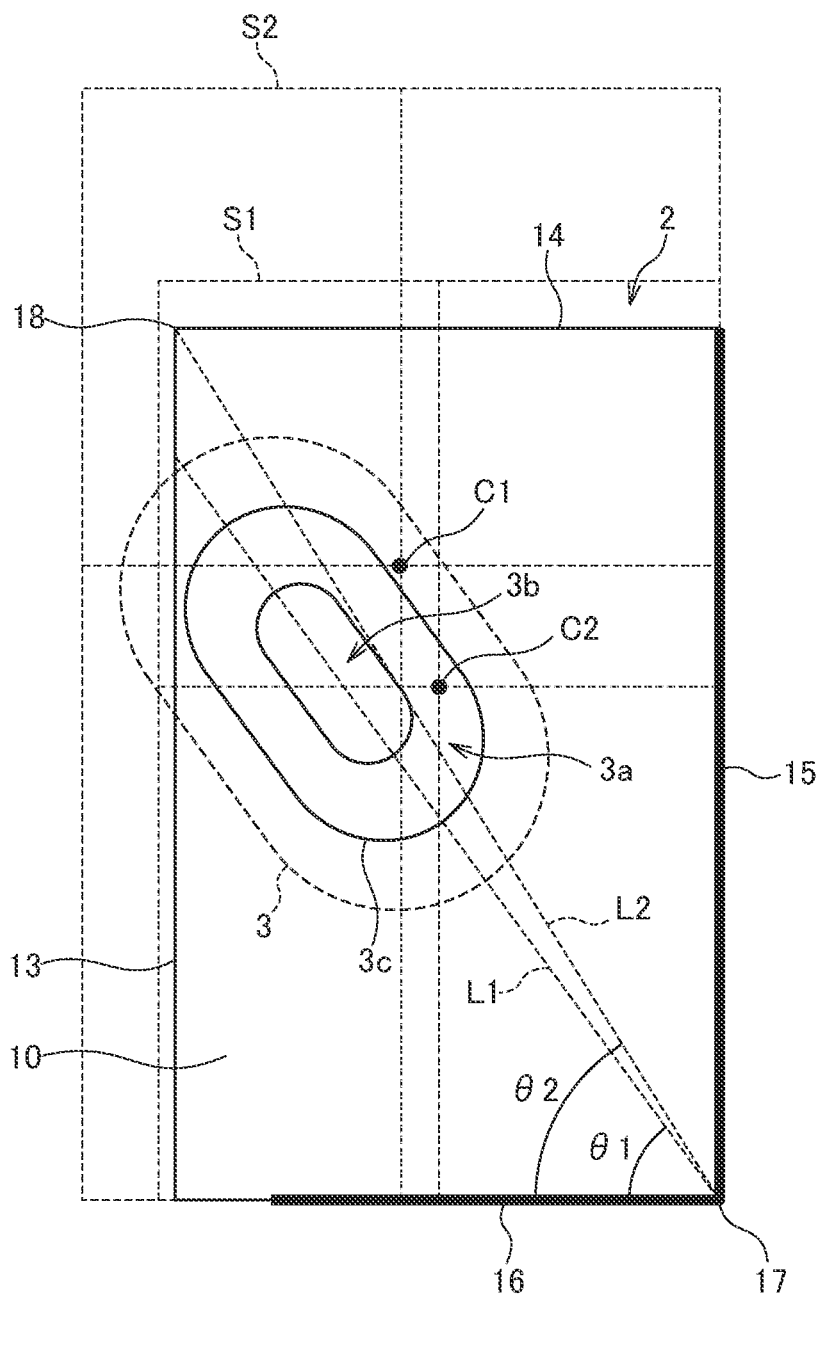
FIG. 4 is a third schematic view for explaining the position of the coil 3c on the flat-plate part 10.
Figure 5:
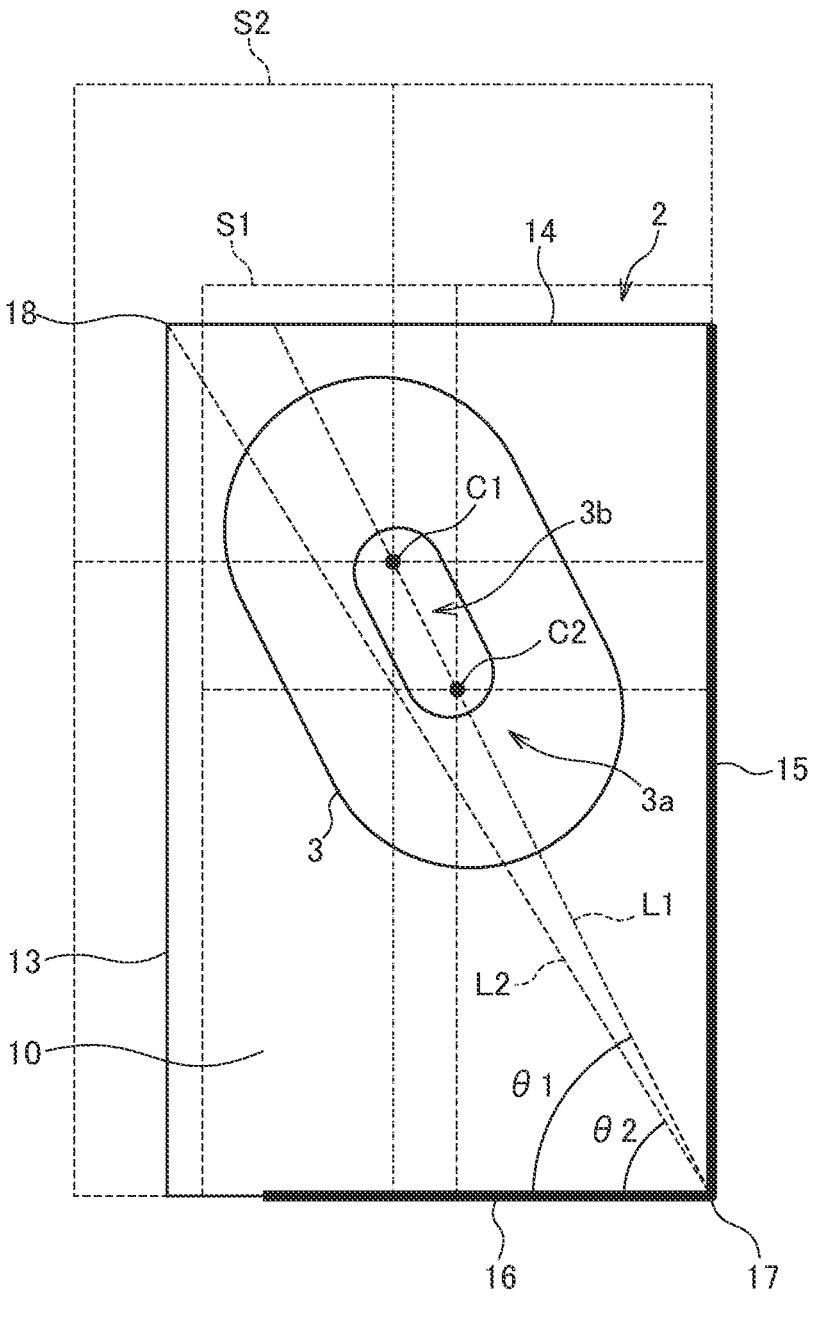
FIG. 5 is a fourth schematic view for explaining the position of the coil 3 on the flat-plate part 10.

The reason why the above layout is employed is as follows. When the relation of θ1=θ2 is made to be satisfied such that the imaginary line L1 and the diagonal line L2 overlap each other, a coil 3c having a smaller wiring area 3a than the above coil 3 needs to be used, as illustrated in FIG. 3, resulting in a reduction in inductance. In particular, as illustrated in FIG. 4, when the imaginary line L1 is made to pass through the corner part 17, and the relation of θ1<θ2 is made to be satisfied, the center position C1 or C2 of the receiving coil of the vertically elongated target device S1 or S2 and the opening area 3b of the coil 3c do not overlap each other, resulting in a significant reduction in power transmission efficiency. On the other hand, when the relation of θ1>θ2 is made to be satisfied as illustrated in FIG. 2, it is possible to achieve high power transmission efficiency while ensuring a sufficient size for the wiring area 3a of the coil 3.

Further, when the imaginary line L1 is made to pass through the corner part 17 even though the relation of θ1>θ2 is satisfied, the width of the flat-plate part 10 in the x-direction becomes larger than the width of the small target device S1 in the x-direction, thus making it difficult for a user to hold the target device S1 being placed on the holder 2. On the other hand, the imaginary line L1 is made to cross the side 12 as illustrated in FIG. 2, a part of the relatively small target device S1 protrudes from the side 13, facilitating user's holding of the target device S1 being placed on the holder 2.

Figure 6:
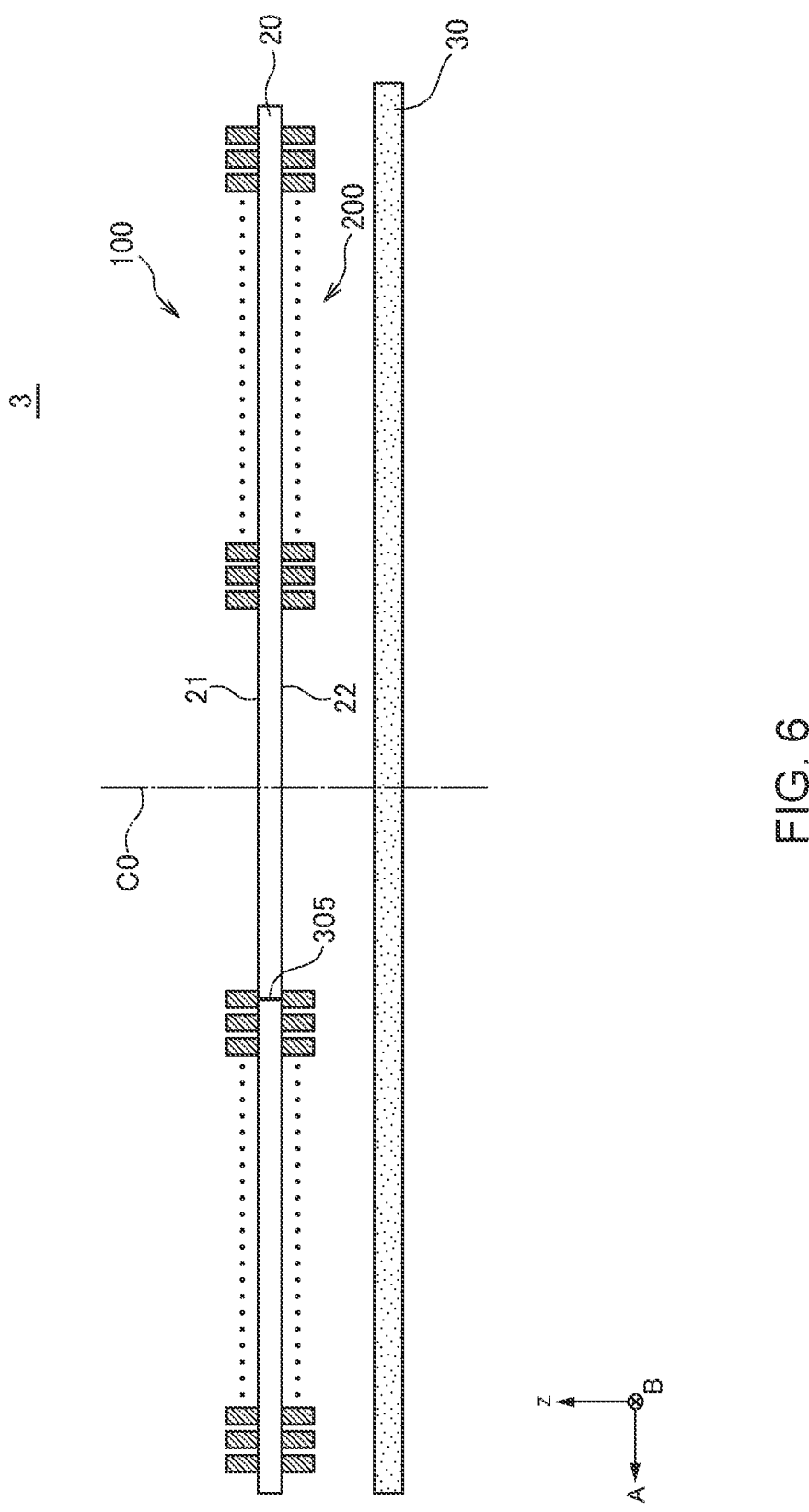
FIG. 6 is a schematic cross-sectional view illustrating the configuration of the coil 3.

FIG. 6 is a schematic cross-sectional view illustrating the configuration of the coil 3.

As illustrated in FIG. 6, the coil 3 has a first coil pattern 100 formed on one surface 21 of the substrate 20 and a second coil pattern 200 formed on the other surface 22 of the substrate 20. The inner peripheral ends of the first coil pattern 100 and the inner peripheral ends of the second coil pattern 200 are connected to each other through a plurality of through hole conductors (in the cross-sectional view of FIG. 6, only a through hole conductor 305 is illustrated) penetrating the substrate 20. The coil 3 is embedded in the holder 2 such that the surface 21 of the substrate 20 faces the placing surface of the flat-plate part 10. A magnetic sheet 30 made of a magnetic material such as ferrite is preferably disposed on the surface 22 side of the substrate 20.

The substrate 20 is not particularly limited in material, and a transparent or semi-transparent flexible insulating material, such as PET resin, may be used. Alternatively, the substrate 20 may be a flexible substrate obtained by impregnating glass cloth with epoxy-based resin.

Figure 7:
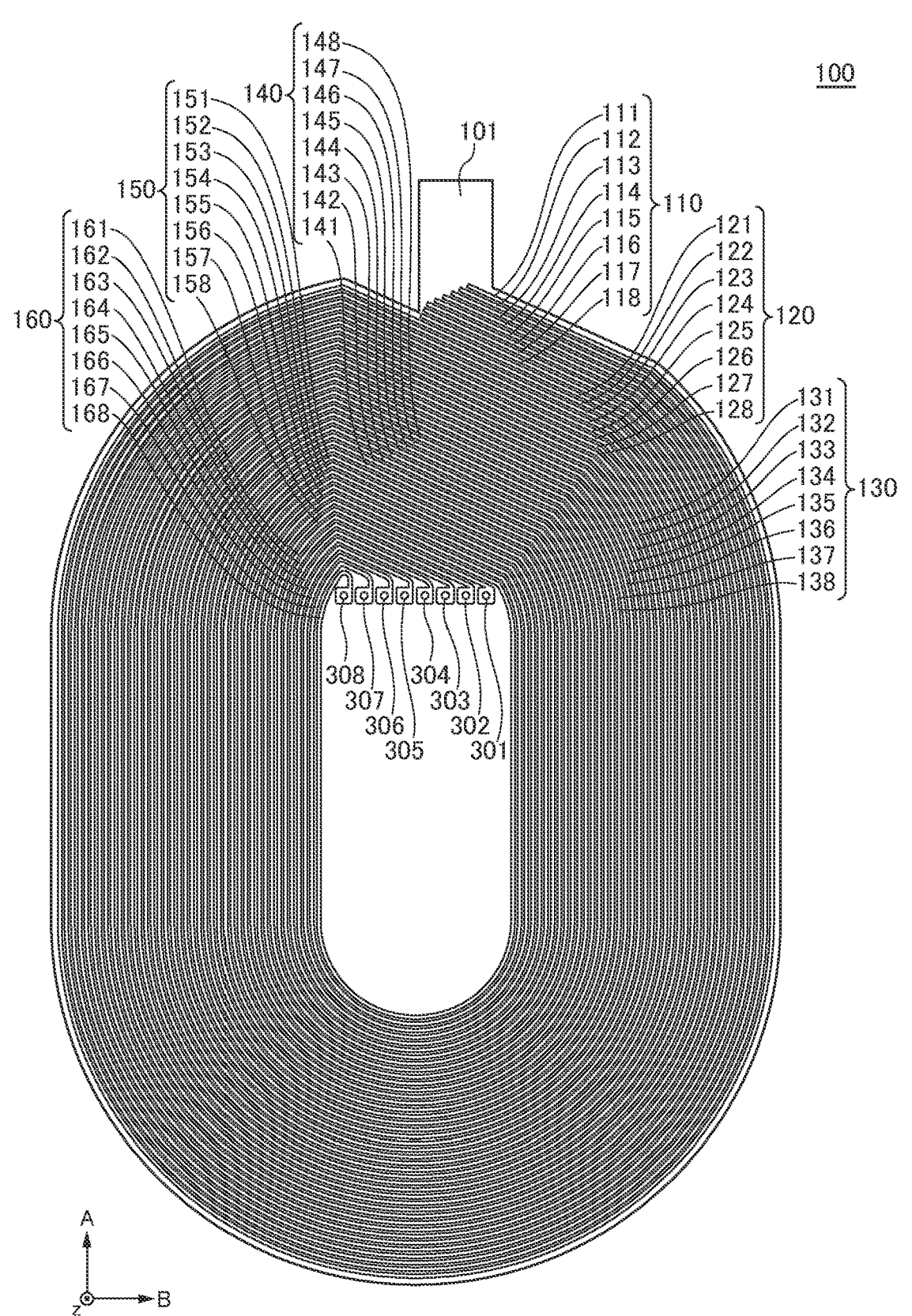
FIG. 7 is a plan view for explaining the pattern shape of the first coil pattern 100 as viewed from the surface 21 of the substrate 20.

FIG. 7 is a plan view for explaining the pattern shape of the first coil pattern 100 as viewed from the surface 21 of the substrate 20.

The first coil pattern 100 has a six-turn configuration constituted of turns 110, 120, 130, 140, 150, and 160. The turn 110 is positioned at the outermost periphery, and the turn 160 is positioned at the innermost periphery. The turns 110, 120, 130, 140, 150, and 160 are each divided into eight lines by seven spiral slits. Specifically, the turn 110 is divided into eight parallel lines 111 to 118, the turn 120 is divided into eight parallel lines 121 to 128, the turn 130 is divided into eight parallel lines 131 to 138, the turn 140 is divided into eight parallel lines 141 to 148, the turn 150 is divided into eight parallel lines 151 to 158, and the turn 160 is divided into nine parallel lines 161 to 168.

The lines 111, 121, 131, 141, 151, and 161 constitute a continuous line spirally wound in six turns, the lines 112, 122, 132, 142, 152, and 162 constitute a continuous line spirally wound in six turns, the lines 113, 123, 133, 143, 153, and 163 constitute a continuous line spirally wound in six turns, the lines 114, 124, 134, 144, 154, and 164 constitute a continuous line spirally wound in six turns, the lines 115, 125, 135, 145, 155, and 165 constitute a continuous line spirally wound in six turns, the lines 116, 126, 136, 146, 156, and 166 constitute a continuous line spirally wound in six turns, the lines 117, 127, 137, 147, 157, and 167 constitute a continuous line spirally wound in six turns, and the lines 118, 128, 138, 148, 158, and 168 constitute a continuous line spirally wound in six turns. The lines 111, 121, 131, 141, 151, and 161 are lines positioned at the outermost peripheries of their corresponding turns, and the lines 118, 128, 138, 148, 158, and 168 are lines positioned at the innermost peripheries of their corresponding turns.

The outer peripheral ends of the lines 111 to 118 are connected in common to a terminal electrode pattern 101. The innermost peripheral ends of the lines 161 to 168 are connected respectively to through hole conductors 301 to 308 penetrating the substrate 20. The through hole conductors 301 to 308 are arranged in the direction B.

Figure 8:
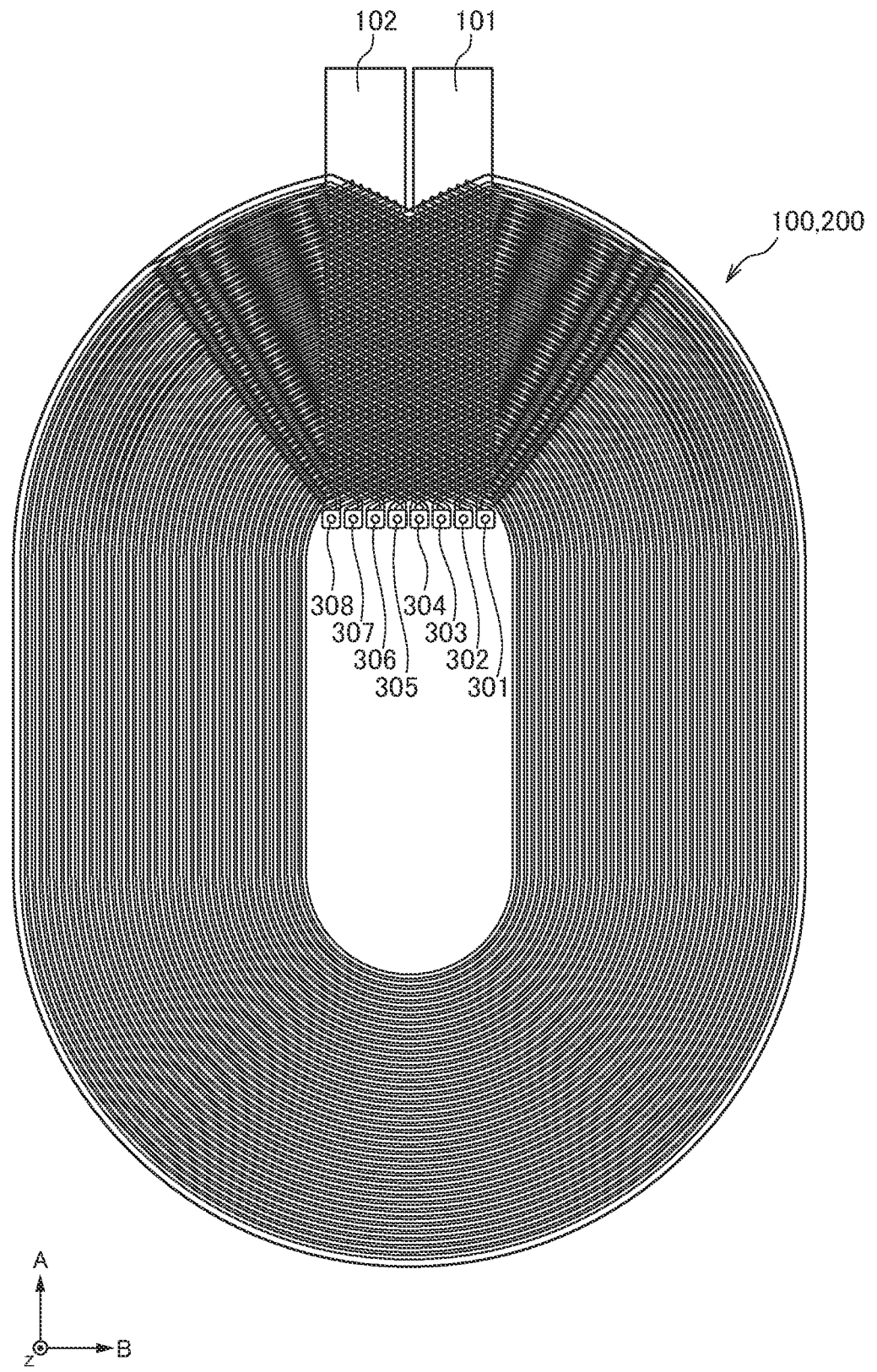
FIG. 8 is a plan view for explaining the pattern shape of the first coil pattern 100 and the second coil pattern 200 as viewed from the surface 21 of the substrate 20.

The pattern shape of the second coil pattern 200 as viewed from the surface 22 side of the substrate 20 is the same as the pattern shape of the first coil pattern 100 as viewed from the surface 21 side of the substrate 20. The eight lines constituting the innermost peripheral turn of the second coil pattern 200 are connected to the eight lines constituting the innermost peripheral turn of the first coil pattern 100 respectively through the through hole conductors 301 to 308. The first and second coil patterns 100 and 200 are formed on the front and back surfaces of the substrate 20 respectively such that the coil axes thereof coincide with each other. Thus, as illustrated in FIG. 8, the lines constituting the first coil pattern 100 and the lines constituting the coil pattern 200 mutually overlap in the z-direction. The eight lines constituting the outermost peripheral turn of the second coil pattern 200 are connected in common to a terminal electrode pattern 102.

Figure 9:
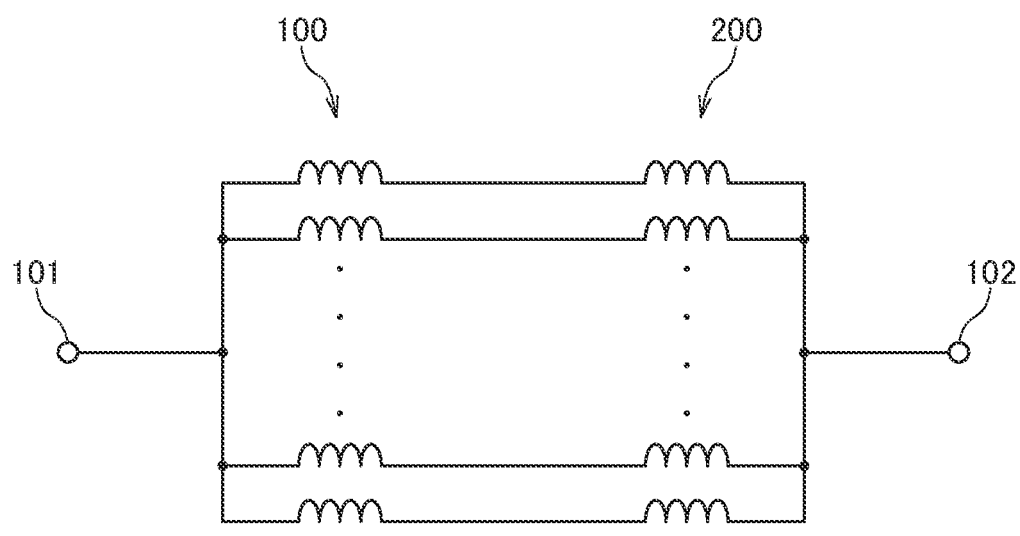
FIG. 9 is an equivalent circuit diagram of the coil 3.

With the above configuration, as illustrated in FIG. 9, the first and second coil patterns 100 and 200 are connected in series between the first and second terminal electrode patterns 101 and 102. Since the first and second coil patterns 100 and 200 each have the six-turn configuration, there is obtained a coil having a 12-turn configuration in total. In addition, the outermost peripheral line of the first coil pattern 100 is connected to the innermost peripheral line of the second coil pattern 200, and the innermost peripheral line of the first coil pattern 100 is connected to the outermost peripheral line of the second coil pattern 200, whereby inner and outer peripheral difference is eliminated.

Figure 10:
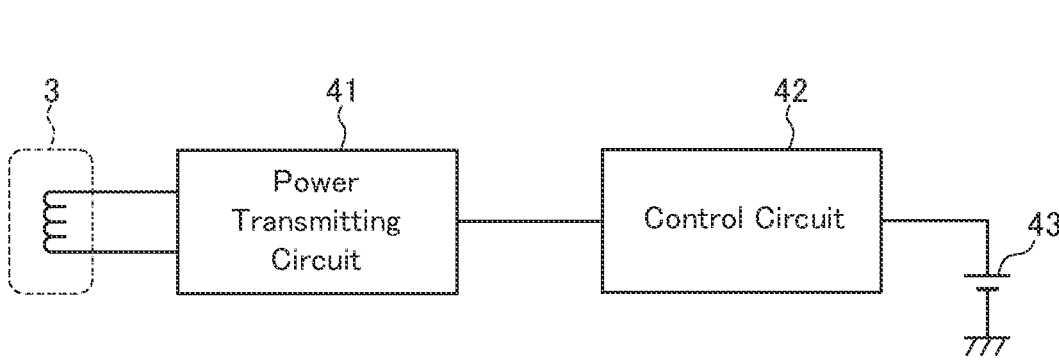
FIG. 10 is a block diagram illustrating a wireless power transmitting device 40 using the coil module 1.

FIG. 10 is a block diagram illustrating a wireless power transmitting device 40 using the coil module 1 according to the present embodiment.

The wireless power transmitting device 40 illustrated in FIG. 10 includes the coil 3 included in the coil module 1, a power transmitting circuit 41 connected to the coil 3 and a control circuit 42 connected to the power transmitting circuit 41. Thus, power supplied from a power supply 43 can be transmitted wirelessly to the target device S1 or S2 such as a smartphone through the coil 3 for wireless power transmission.

Figure 11:
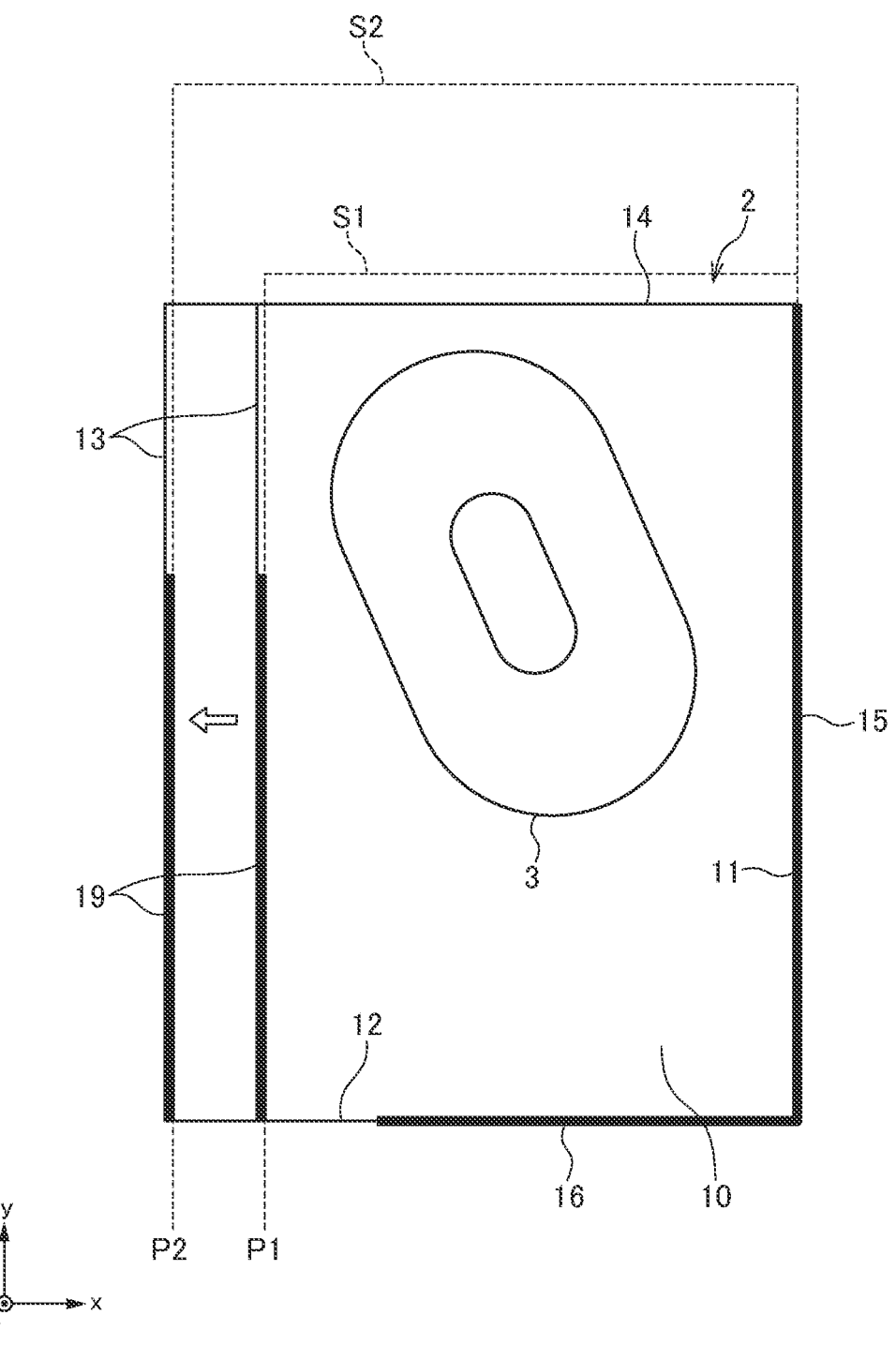
FIG. 11 is a schematic view illustrating a coil module 1A according to a modification.

FIG. 11 is a schematic view illustrating a coil module 1A according to a modification.

As illustrated in FIG. 11, the coil module 1A according to the modification further includes a movable stopper 19 extending in the y-direction along the side 13 of the flat-plate part 10. Other basic configurations are the same as those of the above-described coil module 1, so the same reference numerals are given to the same elements, and overlapping description will be omitted.

The movable stopper 19 is movable in the x-direction. Thus, when the small target device S1 is to be placed on the flat-plate part 10, the movable stopper 19 is moved in the x-direction to the position P1 in FIG. 11; and when the large target device S2 is to be placed on the flat-plate part 10, the movable stopper 19 is moved in the x-direction to the position P2 in FIG. 11. This makes the target device S1 or S2 unlikely to come off from the holder 2 when it is held by a user in a state of being placed on the holder 2.

While the preferred embodiment of the present invention has been described, the present invention is not limited to the above embodiment, and various modifications may be made within the scope of the present invention, and all such modifications are included in the present invention.

The technology according to the present disclosure includes the following configuration examples, but not limited thereto.

A coil module according to one embodiment of the present disclosure includes: a holder having a flat-plate part for placing thereon a target device, a first stopper extending in a first direction along a first side of the flat-plate part, and a second stopper extending in a second direction orthogonal to the first direction along a second side of the flat-plate part; and a coil provided so as to overlap the flat-plate part of the holder. As viewed in a coil axis direction, an outer size of the coil in a third direction inclined at a predetermined angle with respect to the first direction is larger than an outer size of the coil in a fourth direction orthogonal to the third direction.

With the above configuration, it is possible to charge various target devices of different sizes in a non-contact manner.

The planar shape of the coil as viewed in the coil axis direction may be an elliptical shape. This allows various target devices of different sizes to be charged efficiently.

An imaginary line extending in the third direction on the flat-plate part so as to pass through the coil axis need not cross a first corner part formed by the first and second sides of the flat-plate part. This facilitates user's holding of the target device being placed on the holder. In this case, the flat-plate part may have a second corner part positioned diagonal to the first corner part, and the angle formed by the imaginary line and the second side of the flat-plate part may be larger than the angle formed by a diagonal line connecting the first and second corner parts and the second side of the flat-plate part. This can ensure a sufficient coil wiring area.

The coil axis need not coincide with the center position of the flat-plate part. This allows various target devices of different sizes to be charged efficiently.

The distance between the coil axis and the second side of the flat-plate part in the first direction may be larger than the distance between the coil axis and the first side of the flat-plate part in the second direction. This can increase power transmission efficiency to a target device having a vertically elongated shape.

The coil may include a first coil pattern provided on one surface of a substrate, a second coil pattern provided on the other surface of the substrate, and through hole conductors penetrating the substrate so as to connect the inner peripheral ends of the first coil pattern and the inner peripheral ends of the second coil pattern. Turns constituting the first and second coil patterns may each be divided into a plurality of parallel lines, and the through hole conductors may be allocated to the plurality of respective lines and arranged in the fourth direction. This can eliminate inner and outer peripheral difference and ensure a sufficient width of the opening area of the coil in the fourth direction.

The holder may further have a movable stopper extending in the first direction along a third side of the flat-plate part opposite to the first side and configured to be movable in the second direction. This makes the target device unlikely to come off from the holder when a user holds the target device in a state of being placed on the holder.

A wireless power transmitting device according to the present disclosure includes the above-described coil module and a power transmitting circuit connected to the coil. This allows the wireless power transmitting device to charge various target devices of different sizes in a non-contact manner.

What is claimed is:

1. A coil module comprising:
   a holder having a flat-plate part for placing thereon a target device, a first stopper extending in a first direction along a first side of the flat-plate part, and a second stopper extending in a second direction orthogonal to the first direction along a second side of the flat-plate part; and
   a coil provided so as to overlap the flat-plate part of the holder,
   wherein the first side is longer than the second side,
   wherein, as viewed in a coil axis direction, an outer size of the coil in a third direction inclined at a predetermined angle with respect to the first direction is larger than an outer size of the coil in a fourth direction orthogonal to the third direction, and
   wherein an imaginary line extending in the third direction on the flat-plate part so as to pass through a coil axis crosses the second side.

2. The coil module as claimed in claim 1, wherein a planar shape of the coil as viewed in the coil axis direction is an elliptical shape.

3. The coil module as claimed in claim 1,
   wherein the flat-plate part has a second corner part positioned diagonal to a first corner part,
   wherein the first corner part is formed by the first side and second side of the flat-plate part, and
   wherein an angle formed by the imaginary line and the second side of the flat-plate part is larger than an angle formed by a diagonal line connecting the first and second corner parts and the second side of the flat-plate part.

4. The coil module as claimed in claim 1, wherein a coil axis does not coincide with a center position of the flat-plate part.

5. The coil module as claimed in claim 1, wherein a distance between a coil axis and the second side of the flat-plate part in the first direction is larger than a distance between the coil axis and the first side of the flat-plate part in the second direction.

6. The coil module as claimed in claim 1,
   wherein the coil includes a first coil pattern provided on one surface of a substrate, a second coil pattern provided on other surface of the substrate, and through hole conductors penetrating the substrate so as to connect an inner peripheral ends of the first coil pattern and an inner peripheral ends of the second coil pattern, and
   wherein each of turns constituting the first and second coil patterns is divided into a plurality of parallel lines, and wherein the through hole conductors are allocated to the plurality of respective lines and arranged in the fourth direction.

7. The coil module as claimed in claim 1, wherein the holder further has a movable stopper extending in the first direction along a third side of the flat-plate part opposite to the first side and configured to be movable in the second direction.

8. The coil module as claimed in claim 1,
   wherein the flat-plate part further has a third side extending in the first direction and positioned opposite to the first side and a fourth side extending in the second direction and positioned opposite to the second side,
   wherein each of the first and third sides is longer than each of the second and fourth sides, and
   wherein the imaginary line crosses the fourth side without crossing the third side.

9. The coil module as claimed in claim 8, wherein the holder is free from a stopper along the third side.

10. The coil module as claimed in claim 9, wherein the holder is free from a stopper along the fourth side.

11. The coil module as claimed in claim 8, wherein the coil is positioned closer to the fourth side than the second side.

12. The coil module as claimed in claim 11, wherein the coil is positioned closer to the third side than the first side.

13. A wireless power transmitting device comprising:
   a coil module comprising:
      a holder having a flat-plate part for placing thereon a target device, a first stopper extending in a first direction along a first side of the flat-plate part, and a second stopper extending in a second direction orthogonal to the first direction along a second side of the flat-plate part; and
      a coil provided so as to overlap the flat-plate part of the holder; and
   a power transmitting circuit connected to the coil,
   wherein the first side is longer than the second side,
   wherein, as viewed in a coil axis direction, an outer size of the coil in a third direction inclined at a predetermined angle with respect to the first direction is larger than an outer size of the coil in a fourth direction orthogonal to the third direction, and
   wherein an imaginary line extending in the third direction on the flat-plate part so as to pass through a coil axis crosses the second side.

14. A coil module comprising:
   a holder including a flat-plate part, a first side extending in a first direction, and a second side extending in a second direction orthogonal to the first direction; and
   a coil provided so as to overlap the flat-plate part of the holder and having a plurality of turns,
   wherein each of the plurality of turns including a first section extending linearly in a third direction inclined with respect to the first and second directions, a second section extending linearly in the third direction, a third section extending at least partially curvilinearly so as to be connected between one end of the first section and one end of the second section, and a fourth section extending at least partially curvilinearly so as to be connected between other end of the first section and other end of the second section.

15. The coil module as claimed in claim 14,
   wherein the third section extends entirely curvilinearly, and
   wherein the fourth section includes a first sub-section extends linearly in a fourth direction inclined with respect to the third direction, a second sub-section extending curvilinearly so as to be connected between the other end of the first section and one end of the first sub-section, and a third sub-section extending curvilinearly so as to be connected between the other end of the second section and other end of the first sub-section.

\* \* \* \* \*